No. 646,337. Patented Mar. 27, 1900.
J. W. WILSON & J. F. WHITCOMB.
NUT LOCK.
(Application filed May 24, 1899.)
(No Model.)

WITNESSES

INVENTORS

UNITED STATES PATENT OFFICE.

JOHN W. WILSON AND JOHN F. WHITCOMB, OF CHICAGO, ILLINOIS.

NUT-LOCK.

SPECIFICATION forming part of Letters Patent No. 646,337, dated March 27, 1900.

Application filed May 24, 1899. Serial No. 718,102. (No model.)

*To all whom it may concern:*

Be it known that we, JOHN W. WILSON and JOHN F. WHITCOMB, citizens of the United States, residing at Chicago, in the county of Cook and State of Illinois, have invented certain new and useful Improvements in Nut-Locks; and we do hereby declare the following to be a full, clear, and exact description of the invention, such as will enable others skilled in the art to which it appertains to make and use the same.

Our invention relates to nut-locks, and particularly to that construction of nut-locks which employ a threaded bolt provided with a longitudinal groove, a spring-washer which engages said groove, and a nut which is provided on its under side with notches, which latter are adapted to be engaged by the spring-washer and the nut thereby prevented from unscrewing; and the invention consists in the novel construction and arrangement of the coiled-spring-tension washer, as will be hereinafter described, whereby a much stronger and stiffer spring can be employed than can now be used with such washers as at present constructed and whereby the nut will be held much more firmly and rigidly in place by reason of the nib which extends into the groove in the bolt being on the engaging end of the washer instead of the free end, thus preventing any tendency on the part of the washer to back up or spring in a rotating manner, thus making it possible to disengage the nut by means of an ordinary wrench without destroying the washer or the notches on the nut and which will be held sufficiently tight by the coiled-spring-tension washer to prevent it possibly becoming loosened by the most violent wear and tear or motion to which such nuts are subjected, particularly when used upon railroad-rails.

Figure 1:
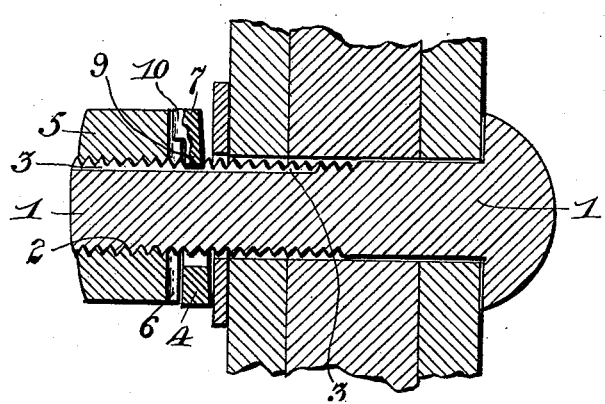
Figure 2:
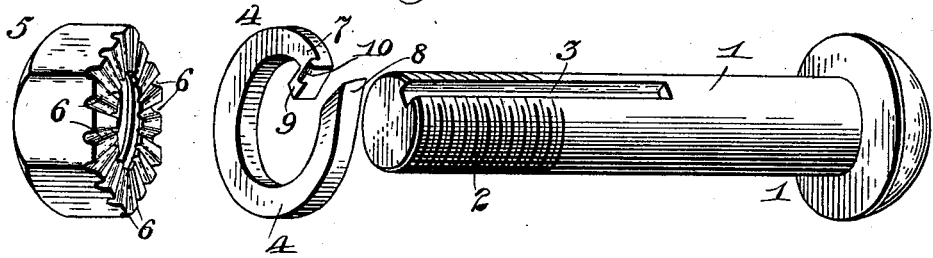

In the accompanying drawings, Figure 1 is a vertical longitudinal section through our improved coiled-spring washer nut-lock; and Fig. 2 represents perspective views of the bolt, nut, and washer as they appear before being brought together.

1 in the drawings represents a bolt which is formed with a screw-threaded portion 2 and provided with a longitudinal kerf or groove 3, which latter extends along the threaded portion.

4 represents a coiled-spring washer, and 5 the nut. The nut 5 is provided on its under side or face with notches 6. The spring-washer 4 is made from a stout piece of steel and is bent in the form of a coil, though the ends do not extend beyond each other, but terminate slightly back of the point where they would meet if continued on a horizontal plane. The end 7 of the spring is thinner than the end 8, and the under side of said end 7 is about on a line with the upper surface of the said end 8. The slightly-thinned or raised end 7 is formed with an inwardly and horizontally extending nib 9, which fits in and engages the groove 3 of the bolt 1 and is also formed with an upwardly-extending tooth or pawl 10, which latter engages the notches 6 on the under side of the nut 5. The notches 6 are made straight, so that the nut can be turned backward or forward over the pawl 10 to tighten or untighten the nut by the use of an ordinary wrench, which could not be done if ratchet-teeth were employed. By providing the nib or projection 9, which extends into the groove 3 of the bolt 1 on the comparatively-thin raised spring end 7, which end also carries the upwardly-extending tooth or pawl 10, which engages the notches 6, the tendency to back up or rotate for a short distance (owing to the slack necessarily allowed in fitting a washer to a bolt) is entirely overcome, giving a perfectly-rigid resistance, which on account of this rigidity, makes it possible to force the tooth or pawl 10 out of engagement with the under side of the nut by the use of an ordinary wrench, which is exceedingly hard, if not impossible, to do when the nib or projection 9, which engages the groove 3 in the bolt, is formed on the other end 8 and the tooth or pawl 10 is formed on the other end 7 of the washer, as in said latter construction, the resistance being very great and the free spring end not being held by the groove 3 against horizontal movement by engaging said groove 3, as in our construction, this end of the washer buckles or backs up, which, as stated above, renders it very difficult, if not impossible, to unscrew the nut without great injury to the notches on the nut.

In our construction to facilitate unscrewing or turning back of the nut the tooth or pawl 10 is beveled or rounded off, as at 11, so that the notches can be easily forced over the same in either direction. We regard the employment of straight notches on the nut instead of ratchet-teeth and rounding the pawl 10, whereby the result above set forth is accomplished, as an important feature of our invention. By constructing the nib or projection 9, which engages the groove 3 of the bolt 1, on the spring end of the washer and also providing the tooth or pawl 10 on said end we are enabled to employ a much stronger coiled-spring washer, owing to the rigid connection at this point. It will also be observed that our form of spring-washer acts as a tension-washer to take up the wear or slack between the parts, the spring accommodating itself to the relation which it bears to the nut and to the surface or part to which the nut-lock is applied. It will also be observed that our nut-lock is applicable to right and left hand threaded bolts and can be applied at any place where nuts and bolts are employed.

Having thus described our invention, what we claim as new, and desire to secure by Letters Patent, is—

1. A nut-lock, comprising in its construction a threaded bolt provided with a longitudinal groove, a nut provided on its under surface with notches, and a coiled-tension-spring washer which is formed with a slightly-raised and comparatively-thin end which end is formed with a projection or nib which engages the groove of the bolt and said end also being formed with an upwardly-extending tooth or pawl which engages the notches on the under side of the nut, substantially as described.

2. A nut-lock, comprising in its construction a threaded bolt provided with a longitudinal groove, a nut provided on its under surface with straight notches, and a stout coiled-spring-tension washer which is formed with a slightly-raised comparatively-thin end, said end being formed with a projection or nib which engages the groove in the bolt, and said end also being formed with an upwardly-extending tooth or pawl which engages the notches on the nut, the pawl being beveled or rounded, to permit the nut to be turned in either direction by the use of an ordinary wrench, substantially as described.

3. As an improved article of manufacture a spring-tension washer for a nut-lock, comprising in its construction, a piece of metal formed into a coil one end of which is comparatively thinner than the other and raised, said raised end being formed with an inwardly-extending nib or projection and also with an upwardly-extending tooth or pawl, substantially as described.

In testimony whereof we hereunto affix our signatures in presence of two witnesses.

JOHN W. WILSON.
JOHN F. WHITCOMB.

Witnesses:
WM. SCHMIDT,
WM. H. BRINKMAN.